(12) United States Patent
Roy (10) Patent No.: US 9,471,333 B2
(45) Date of Patent: Oct. 18, 2016

(54) CONTEXTUAL SPEECH-RECOGNITION USER-INTERFACE DRIVEN SYSTEM AND METHOD

(75) Inventor: Philippe Roy, Kitchener (CA)

(73) Assignee: Conceptual Speech, Llc, Vero Beach, FL (US)

( * ) Notice: Subject to any disclaimer, the term of this patent is extended or adjusted under 35 U.S.C. 154(b) by 727 days.

(21) Appl. No.: 11/934,661

(22) Filed: Nov. 2, 2007

(65) Prior Publication Data

US 2010/0138759 A1    Jun. 3, 2010

Related U.S. Application Data

(60) Provisional application No. 60/864,347, filed on Nov. 3, 2006.

(51) Int. Cl.
- *G06F 9/44* (2006.01)
- *G06F 9/445* (2006.01)
- G06F 3/0487 (2013.01)
- G06F 3/16 (2006.01)
- G10L 15/22 (2006.01)

(52) U.S. Cl.
CPC ......... *G06F 9/4443* (2013.01); *G06F 9/44505* (2013.01); *G06F 3/0487* (2013.01); *G06F 3/16* (2013.01); *G06F 9/4445* (2013.01); *G06F 2203/0381* (2013.01); *G10L 15/22* (2013.01)

(58) Field of Classification Search
CPC .................................................. G06F 9/44505
USPC .......................... 715/727, 788, 817, 825, 803
See application file for complete search history.

(56) References Cited

U.S. PATENT DOCUMENTS

| | | | | |
|---|---|---|---|---|
| 5,201,034 A * | 4/1993 | Matsuura et al. | ........... | 715/865 |
| 5,223,828 A * | 6/1993 | McKiel, Jr. | ............... | 340/4.14 |
| 5,287,102 A * | 2/1994 | McKiel, Jr. | ................. | 340/4.14 |
| 5,583,983 A * | 12/1996 | Schmitter | ..................... | 717/138 |
| 5,920,841 A * | 7/1999 | Schottmuller et al. | ........ | 704/275 |
| 5,983,184 A * | 11/1999 | Noguchi | ........................ | 704/270 |
| 6,026,358 A * | 2/2000 | Tomabechi | ................... | 704/232 |
| 6,084,556 A * | 7/2000 | Zwern | ............................. | 345/8 |
| 6,349,132 B1 * | 2/2002 | Wesemann et al. | ....... | 379/88.17 |
| 6,438,523 B1 * | 8/2002 | Oberteuffer et al. | ........ | 704/270 |
| 6,518,987 B1 * | 2/2003 | Crevasse et al. | ............ | 715/810 |
| 7,484,174 B2 * | 1/2009 | Alderson | ...................... | 715/746 |
| 7,506,345 B2 * | 3/2009 | Stall | ............................. | 719/329 |
| 7,558,861 B1 * | 7/2009 | Qidwai et al. | ............... | 709/227 |
| 7,620,890 B2 * | 11/2009 | Dietl et al. | .................... | 715/234 |
| 7,624,355 B2 * | 11/2009 | Baneth | ......................... | 715/802 |
| 7,669,149 B2 * | 2/2010 | Dietl et al. | .................... | 715/865 |

(Continued)

*Primary Examiner* — Jeffrey A Gaffin
*Assistant Examiner* — John H Heffington (57) ABSTRACT

In an effort to customize or enhance software applications, configuration data is often used. Configuration settings that are editable by users need not to be limited to a simple flat entry that can be taken out of context anymore. The present invention allows for multiple-levels of configuration settings to interact with each other, so that a single configuration for a given context to be calculated dynamically. In the process, the user gains flexibility to specify more adequately a required change or customization while propagating the information with minimal effort and not requiring additional coding. Furthermore, to simplify a speaker's interactions for controlling an automated device, the addition of a superposed layer over graphic user interface may be used. The superposed layer may display coordinates that a speaker may use to navigate the graphic user interface, for example to associate a location with a keyword or a coordinate.

20 Claims, 4 Drawing Sheets

(56) References Cited

U.S. PATENT DOCUMENTS

| | | | |
|---|---|---|---|
| 7,696,979 B1* | 4/2010 | Skergan | 345/157 |
| 7,870,504 B1* | 1/2011 | McIntosh | G06F 9/4445 715/704 |
| 8,627,226 B2* | 1/2014 | Bates et al. | 715/785 |
| 8,645,850 B1* | 2/2014 | Milne | 715/762 |
| 8,725,513 B2* | 5/2014 | Cross et al. | 704/270 |
| 8,732,607 B1* | 5/2014 | Grechishkin et al. | 715/781 |
| 8,781,830 B2* | 7/2014 | Bodin et al. | 704/235 |
| 8,793,583 B2* | 7/2014 | Mckoen et al. | 715/728 |
| 8,798,999 B2* | 8/2014 | Ozkaragoz et al. | 704/270 |
| 2002/0029784 A1* | 3/2002 | Stark et al. | 128/898 |
| 2002/0052977 A1* | 5/2002 | Stall | 709/313 |
| 2003/0112275 A1* | 6/2003 | Proulx et al. | 345/762 |
| 2003/0154024 A1* | 8/2003 | Klein et al. | 701/210 |
| 2004/0006593 A1* | 1/2004 | Vogler et al. | 709/203 |
| 2004/0064597 A1* | 4/2004 | Trewin | 710/8 |
| 2004/0153973 A1* | 8/2004 | Horwitz | 715/530 |
| 2005/0140696 A1* | 6/2005 | Buxton | 345/660 |
| 2005/0149881 A1* | 7/2005 | Proulx et al. | 715/853 |
| 2005/0204295 A1* | 9/2005 | Voorhees et al. | 715/747 |
| 2005/0240944 A1* | 10/2005 | Stall | 719/329 |
| 2006/0008123 A1* | 1/2006 | Sweeney | 382/114 |
| 2006/0026537 A1* | 2/2006 | L'Heureux | 715/863 |
| 2006/0047704 A1* | 3/2006 | Gopalakrishnan | 707/104.1 |
| 2006/0107237 A1* | 5/2006 | Kim | 715/858 |
| 2006/0209214 A1* | 9/2006 | Fader et al. | 348/584 |
| 2006/0271520 A1* | 11/2006 | Ragan | 707/3 |
| 2007/0055943 A1* | 3/2007 | McCormack et al. | 715/746 |
| 2007/0143662 A1* | 6/2007 | Carlson et al. | 715/507 |
| 2007/0256027 A1* | 11/2007 | Daude | 715/810 |
| 2007/0283239 A1* | 12/2007 | Morris | 715/511 |
| 2009/0013038 A1* | 1/2009 | Vogler et al. | 709/203 |
| 2009/0157291 A1* | 6/2009 | Kudo et al. | 701/200 |
| 2014/0101606 A1* | 4/2014 | Albrecht et al. | 715/803 |
| 2014/0115538 A1* | 4/2014 | Kim et al. | 715/825 |
| 2014/0215339 A1* | 7/2014 | Klein et al. | 715/727 |
| 2014/0215340 A1* | 7/2014 | Shetty et al. | 715/727 |
| 2014/0325484 A1* | 10/2014 | Gillaspie | G06F 11/3664 717/124 |

* cited by examiner

CONTEXTUAL SPEECH-RECOGNITION USER-INTERFACE DRIVEN SYSTEM AND METHOD

FIELD OF INVENTION

This system and method relates to the field of software programming. More precisely, the invention provides systems and methods for contextual configuration management of various software applications in such a way that the software according to the present invention can enhance or modify any aspect of various software applications without change or access to the source code. In particular, speech interfaces are provided for non-native speech interface applications. The present invention also provides an efficient method of processing user input in a speech recognition interface by adding a graphical layer over a typical graphical user interface that is non-disruptive.

BACKGROUND OF THE INVENTION

Software system architectures typically provide application software, operating system software, and possibly utility software. The operating system provides a set of known resources for the applications, and thus allows a software application writer to generate a program which relies on a standardized interface to the hardware, other applications, and the environment. Utility software may be designed to interact with an application, and may modify the way that it operates. An example is a macro recorder and playback utility, which records and recreates user interface inputs, to allow automated control of a software application.

SUMMARY OF THE INVENTION

According to a first aspect of the invention, a layered contextual configuration management system and method is provided.

One aspect of the invention is to calculate or compute the contextual configuration provided the given state of a computer operating system running software applications (called context). Such calculated contextual configuration can then describe desired enhancements of non-proprietary software (i.e., software separate or independent from the present invention) that can be implemented from proprietary software (i.e., software according to the present invention) while requiring only a minimum of input from a software user about the non-proprietary software into the proprietary software, and not requiring coding into the non-proprietary software for the purpose of enhancement or modification. See, U.S. Pat. No. 6,071,317, expressly incorporated herein by reference.

A successful implementation of this embodiment avoids the need for access to, and use of, most Software Development Kits (SDK) to adapt non-proprietary software without sacrificing any flexibility from the user or software developer's perspective, provided the fact that targeted proprietary software can allow enhancement or modification of functionality from the proprietary software.

For example, an implementation according to a preferred embodiment of the present invention is related to speech recognition proprietary software that enhances non-proprietary software through the addition of speech recognition functionality, without requiring additional coding into the non-proprietary software to access that functionality. The proprietary software implementing this embodiment can run (as a daemon process) on an operating system while monitoring for changes in contexts, like a change in the top-application or a top-window or a top-keyboard-focus edit field. Once a change is detected, the proprietary software can refer to stored configuration files (e.g., one per level) so that a single configuration for the context is calculated while consolidating the requirements from each level. It is noted that it is not required that a static stored configuration for each level be provided, and for example, the configuration may be dynamically generated, for example based on a set of available applications, or a status of respective applications. The speech recognition proprietary software can then activate or deactivate features on the operating system or application(s) as a consequence of this context configuration that was calculated. Such a method and system consequently provides a flexible and efficient way of enhancing non-proprietary software without requiring code change at that end.

According to a second embodiment of the invention, a system and method for minimized input speech recognition user interface interactions experience is provided.

In an effort to improve the speech recognition experience, and more particularly, to respect the human brain limitations in regards to how many voice commands can be memorized by an average person, this aspect of the present invention provides systems and methods for interaction with an automated device though voice. Through the use, for example, of superposed speech recognition related content on a computer screen, that does not disrupt commonly known state-of-the-art input methods—like mouse and keyboard focus in a window of most modern operating systems, modern operating systems are complemented with a speech recognition dedicated user-interface.

According to a third embodiment of the invention, a computer display or dialog from non-proprietary software or an operating system is enhanced through the addition of "hot spots", which are, for example, graphic indications of interactive elements on a graphic user interface generated by the non-proprietary software which have been "enabled" or enhanced with functionality or alternate access capability by the proprietary software. For example, a text-labeled screen button may be linked to a speech command, such that receipt and processing of the speech command will activate the screen button. The hot spot is graphically indicated, for example, by a green spot adjacent to the screen button, indicating to a user that a text label associated with a graphic user interface interactive element is enabled for immediate activation by the proprietary software.

DEFINITIONS

"Levels" (L): A natural division of inclusion—$L_i$ has $L_{(i+1)}$, or $L_{(i+1)}$ is in $L_i$—occurring into a computer operating system. $L_i$ is used to identify the level i. The range of i is from 0 to N.

"Attributes" (A): A placeholder for a value or a list of values that can be changed by a user. For example, a placeholder for the volume level, and a placeholder for a list of e-mail addresses on a computer system are attributes. $A_j$ is used to identify the $j^{th}$ attribute. The range of j is from 1 to P. $A_{ji}$ is used to identify the $j^{th}$ attribute on level i (or in $C_i$).

"Configuration" (C): Stored values allocated to attributes (which may be stored in file or in memory) representing desired enhancement or desired behavior for a targeted aspect of processing. For example, the grouping of the 'sound output device', 'sound input device' and 'volume' values for the corresponding attributes could constitute a 'sound' configuration. $C_i$ is used to identify the configuration of level i.

"Layered Configuration" (LaC): Optional stored values allocated to attributes subset (which may be stored in file or in memory) overwriting the Configuration ($C_i$) and representing a potentially different desired enhancement or desired behavior for a targeted aspect of processing. $LaC_k$ is used to identify the $k^{th}$ Layered Configuration. $LaC_{ki}$ is used to identify the $k^{th}$ Layered Configuration of level i. k may range from 0 to Q.

"Level Criteria" ($LC_i$): A unique level identifier describing the context for the corresponding level. $LC_i$ is used to identify the level criteria of level i. $LC_{it}$ is used to identify the level criteria of level i at time t. For example, in the preferred embodiment of this invention, for the application level ($L_1$), $LC_1$ could be the application name; the string "Microsoft Word" can be used for $LC_{1t}$ if Microsoft Word is the foreground application at the time t.

"Context" ($Cx_t$): The differentiating set of level criteria at a given time. $Cx_t = \{LC_{0t} \ldots LC_{Nt}\}$ is used to identify the context at time t.

"Level Contextual Configuration" (LCC): $LCC_i$ is the resulting calculated configuration from $CLF_i$ based, in part, on $LCC_{i-1}$ and $C_i$ if i>0, or $C_i$ if i=0. $LCC_i$ is used to identify the level contextual configuration of level i. $LCC_{it}$ is used to identify the level contextual configuration of level i at time t.

"Contextual Configuration" (CC): $CC_t$ is $LCC_{Nt}$ after GCMP processing where N is the value representing the highest level at a given time t. Obtaining this value is the goal of this invention.

"Configuration Level Filtering" (CLF): $CLF_i$ is the process by which $LCC_{i-1}$ and $C_i$, if i>0, or $C_i$, if i=0, are consolidated into $LCC_i$. $CLF_i$ is used to identify the configuration level filtering of level i.

"Promotion Attributes" (PA): $PA_{ik}$ is the promotion attribute that relates to a subset of attributes in $C_i$ (stored in file or in memory) describing the desired consolidation of $LCC_{(i-1)t}$ and $C_i$ into $LCC_{it}$ during $CLF_i$. $PA_{ik}$ is used to identify the $k^{th}$ promotion attribute of level i. k is expected to range from 1 to M. A promotion attribute is an attribute.

"Global Configuration" (GC): A unique configuration that describes changes to make on targeted attributes prior to promoting to contextual configuration (CC).

"Global Configuration Modifier Process" (GCMP): The Global Configuration Modifier Process (GCMP) is a process by which the highest level contextual configuration ($LCC_N$) is optionally modified provided the content of the Global Configuration (GC).

"Window Id": The window Id is a unique description of the hierarchy to locate or differentiate a window or an edit field into a window. For example, on the Windows operating system: {OpusApp,"Microsoft Word *"}, {MsoCommand-BarPopup,"Border Color"} where OpusApp and MsoCommandBarPopup are class Ids, and "Microsoft Word *" and "Border Color" are window names (and the '*' character in the window name is a wild card identifier).

DESCRIPTION OF THE PREFERRED EMBODIMENTS

Example 1

The use of configuration in software is well known. However, configuration has mainly been seen as a homogenous input that is provided by a user from which the only apparent use from a software is to statically refer to it. The novelty exposed by this invention is that contextual configuration at any given time t ($CC_t$) can be calculated based on the context managed by levels ($L_{0t} \ldots L_{Nt}$), and filtered based on promotion attributes ($PA_{01} \ldots PA_{NM}$). With this invention, the user is allowed all the flexibility that is sometimes required to fully customize a non-proprietary application without more restriction than what a Software Development Kit (SDK) would normally impose, and without modifying the source code of the non-proprietary software—contrarily to the experience when an SDK is used. In the process, this invention also allows for the configuration maintained by the user to be optimally propagated and results into minimal input required while still providing full-control to the user over the management of his or her customization (instead of relying on a software coder).

At any given time t, an automated device like a computer operating system can be associated a context ($Cx_t$) from a finite set of level criteria ($LC_0 \ldots LC_N$) corresponding to each level ($L_0 \ldots L_N$)—each of them potentially holding fixed configuration ($C_i$) and fixed promotion attributes ($PA_{i1} \ldots PA_{iM}$). For the preferred embodiment of this invention, the levels are:

The base level ($L_0$)

The top application ($L_1$)

The top window in the top application ($L_2$)

The edit item that has keyboard focus in top window of top application ($L_3$)

The lowest level ($L_0$) is the most universal level, and the highest level ($L_N$) is the less universal one. The corresponding level criteria ($LC_i$), in the preferred embodiment of this invention are:

NULL for $LC_0$.

The top application name for $LC_1$. For example: "Microsoft Word".

The window Id of the top window in the top application for $LC_2$.

The window Id of the current edit field in the top window of the top application for $LC_3$.

The configuration on all levels ($C_0 \ldots C_N$) hold values for the same attributes ($A_1 \ldots A_p$) and promotion attributes ($PA_1 \ldots PA_M$). The values assigned to the attributes and promotion attributes are unrelated to each others on different levels; i.e. they are not expected to be the same nor different. One aspect of the present invention therefore calculates a unique contextual configuration at a time t ($CC_t$), based on the context at that time t ($Cx_t$), and a fixed set of configuration maintained by the user for each level ($C_0 \ldots C_N$). In the process of calculating $CC_t$, $LCC_0 \ldots LCC_N$ are generated as a residue, and are transient by nature.

In the preferred embodiment, the base level ($L_0$) holds a configuration ($C_0$) that is influencing the contextual configuration ($CC_t$) for all times t. $LC_0$ never changes since the base level applies for all contexts. In the preferred embodiment, there is always a top application running on a computer operating system. Consequently, a top application running level ($L_1$) and its associated configuration ($C_1$) is always influencing the contextual configuration ($CC_t$) being calculated. For the preferred embodiment, the top application ($LC_1$) can be defined as the application that holds some level of focus. That is, the application that has the unique edit item holding keyboard focus ($LC_3$), or, if no edit item has keyboard focus ($LC_3$=NULL), the application that has the window holding graphical user-interface focus ($LC_2$). In the event that no edit item has keyboard focus ($LC_3$=NULL) and no window has graphical user-interface focus ($LC_2$=NULL), the top application ($LC_1$) is simply the application at the top of the operating system process chain.

To calculate the contextual configuration ($CC_t$) for a given context at a given time t ($Cx_t$) with the base level criteria ($LC_0$), a determined top application ($LC_{1t}$), a determined top-window ($LC_{2t}$ where $LC_{2t}$ can be NULL), a determined current edit item holding keyboard focus ($LC_{3t}$ where $LC_{3t}$ can be NULL), all applicable levels ($L_0 \ldots L_N$) can have some associated configuration ($C_0 \ldots C_N$) maintained by the user. In the event that one or more level does not have associated configuration stored ($C_i$=NULL), some default configuration and default promotion attributes can be generated potentially differently for each applicable level. At initialization time of the process (t=0), or when one or more level criteria change is detected, i.e. there is an i for which $LC_{it1} \neq LC_{it2}$ (for given times t1 and t2) the method calls for the contextual configuration ($CC_t$) to be recalculated. Such recalculation of the contextual configuration ($CC_t$) is described in FIG. 1. For the preferred embodiment, the method starts with the lowest or most universal level ($L_0$) and loads its associated configuration ($C_0$). For the preferred embodiment, it then passes the configuration to its associated configuration level filtering ($CLF_0$) to calculate the corresponding level contextual configuration ($LCC_0$). Although not the preferred embodiment of this invention, this lowest configuration level filtering at the base level ($CLF_0$) is not essential for the good execution of the invention, and the base level configuration ($C_0$), instead of the base level contextual configuration ($LCC_0$), can be passed directly to the upper configuration level filtering ($CLF_1$). For the preferred embodiment, the contextual level configuration ($LCC_i$) is then passed to the next configuration level filtering ($CLF_{i+1}$). The next level's configuration level filtering ($CLF_{i+1}$) also loads its associated configuration ($C_{i+1}$), and consolidates both configuration provided promotion attributes ($PA_{(i+1)0} \ldots PA_{(i+1)M}$) in its own level contextual configuration ($LCC_{(i+1)}$). Each level configuration ($C_0 \ldots C_N$) also stores 1 to M promotion attributes ($PA_{ik}$) related to attributes representing enhancement or modification to a non-proprietary software. $PA_{ik}$ is associated to a subset of attributes in the configuration $C_i$ that are all mutually exclusive to each others. For example, for the speech recognition implementation using this invention, the promotion attributes may relate to 'command and control' attributes, 'spell mode' attributes, 'dictation' attributes or 'mouse control' attributes. Each promotion attribute ($PA_{ik}$) is to then used by each corresponding configuration level filtering ($CLF_i$) to calculate the corresponding level contextual configuration ($LCC_i$). For the preferred embodiment, the possible promotion attributes ($PA_{ik}$) values are:

Promote (PROMOTE)—available only for $PA_1 \ldots PA_N$.

Do not promote, do not use current (DNPDNUC)—available for $PA_0 \ldots PA_N$.

Do not promote, use current (DNPUC)—available for $PA_0 \ldots PA_N$.

Merge (MERGE)—available only for $PA_1 \ldots PA_N$ and only when corresponding to attributes that hold a list.

In the preferred embodiment, filtering on a level ($CLF_i$) refers to promotion attributes ($PA_{i1} \ldots PA_{iM}$) to calculate the associated level contextual configuration ($LCC_{it}$) at that time t.

In the event that a promotion attribute ($PA_{ik}$) is PROMOTE, the corresponding attributes ($A_{ji}$) related to the promotion attribute ($PA_{ik}$) of the current level configuration ($C_i$) are ignored, and the corresponding attributes ($A_{j(i-1)}$) related to the lower level's contextual configuration ($LCC_{(i-1)}$) are affected into the contextual configuration from the current level ($CC_i$). In the event that the promotion attribute ($PA_{ik}$) is DNPDNUC, the corresponding attributes ($A_{ji}$) related to the promotion attribute ($PA_{ik}$) are re-initialized and/or flagged as disabled. In the event that the promotion attribute ($PA_{ik}$) is DNPUC, the corresponding attributes ($A_{ji}$) related to the current's level configuration ($C_i$) are affected to the current level contextual configuration ($CC_i$) and the corresponding attributes ($A_{j(i-1)}$) of the lower level contextual configuration ($LCC_{(i-1)}$) are ignored. In the event that a promotion attribute ($PA_{ik}$) is MERGE (available for list attributes and levels higher than 0 only), the corresponding attributes ($A_{ji}$) related to the current's level configuration ($C_i$) are merged with the corresponding attributes ($A_{j(i-1)}$) of the lower level contextual configuration ($LCC_{(i-1)}$) into the current level contextual configuration ($LCC_i$). The contextual level filtering is repeated for all levels. In the preferred embodiment of this invention, when all levels have calculated their level contextual configuration, the highest level contextual configuration ($LCC_N$) is passed to the Global Configuration Modifier Process (GCMP) which also refers to Global Configuration (GC) in order to consolidate both inputs into the Contextual Configuration ($CC_t$). This last step of processing prior to generating $CC_t$ is useful to change some attributes globally. For example, in the speech recognition implementation of this invention, the Global Configuration GC may hold some information like stating that the current user is blind, or deaf, etc. . . . Since the user maintaining, or at least deploying the initial version of Level Configuration ($LC_i$) can be a different user than the user at the time t being calculated, adding the flexibility for the user at time t to change globally its configuration is important. Should the GCMP detect an attribute stating that a user is blind, for example, the GCMP can adapt the text-to-speech attributs to be widely used when $LC_0 \ldots LC_N$ would not advocate the use of text-to-speech. This makes it easy for the end-user to globally change his configuration while also not limiting a different user to deploy configuration for non-proprietary software adaptation or modification without taking all these factors (people being blind, deaf, personal preferences) into consideration, and while still providing useful input for the process.

Up to this point, nothing has been mentioned about Layered Configuration (LaC). Layered Configurations (LaC) are not required for the invention to be functional. Nevertheless, they allow an additional dimension of flexibility. As stated earlier, Configurations ($C_i$) need to hold a value for all Attributes ($A_j$) in order for the Contextual Configuration to be calculated. When Layered Configurations ($LaC_{ki}$) are used (Q>0), each Configuration ($C_i$) stays the same, requiring that a value be set for each Attribute ($A_0 \ldots A_p$). The difference between a Layered Configuration ($LaC_{ki}$) and a Configuration ($C_i$) is that the Layered Configuration ($LaC_{ki}$) needs to hold a value only for the Attributes $A_j$ that is desired to overwrite from the Configuration ($C_i$). As the Configurations ($C_i$) go forward in the process, if a non-empty Layered Configuration is encountered ($LaC_{ki}$), since only the Attributes ($A_j$) that are desired to overwrite the Configuration $C_i$ are kept, other original Attributes from $C_i$ will stay untouched.

Figure 1:
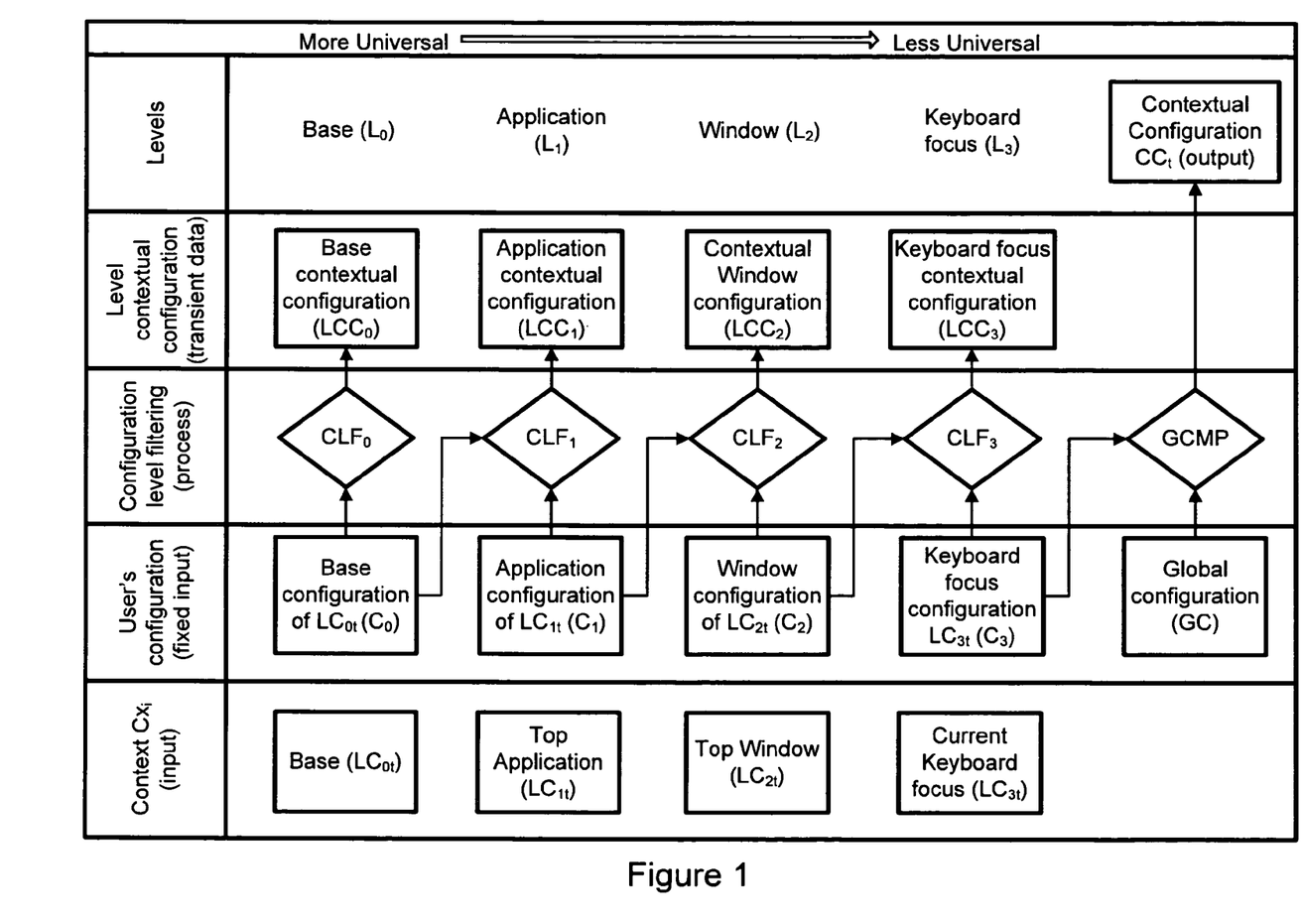
FIG. 1 shows a flowchart of a process according to a first embodiment of the invention.
Figure 2:
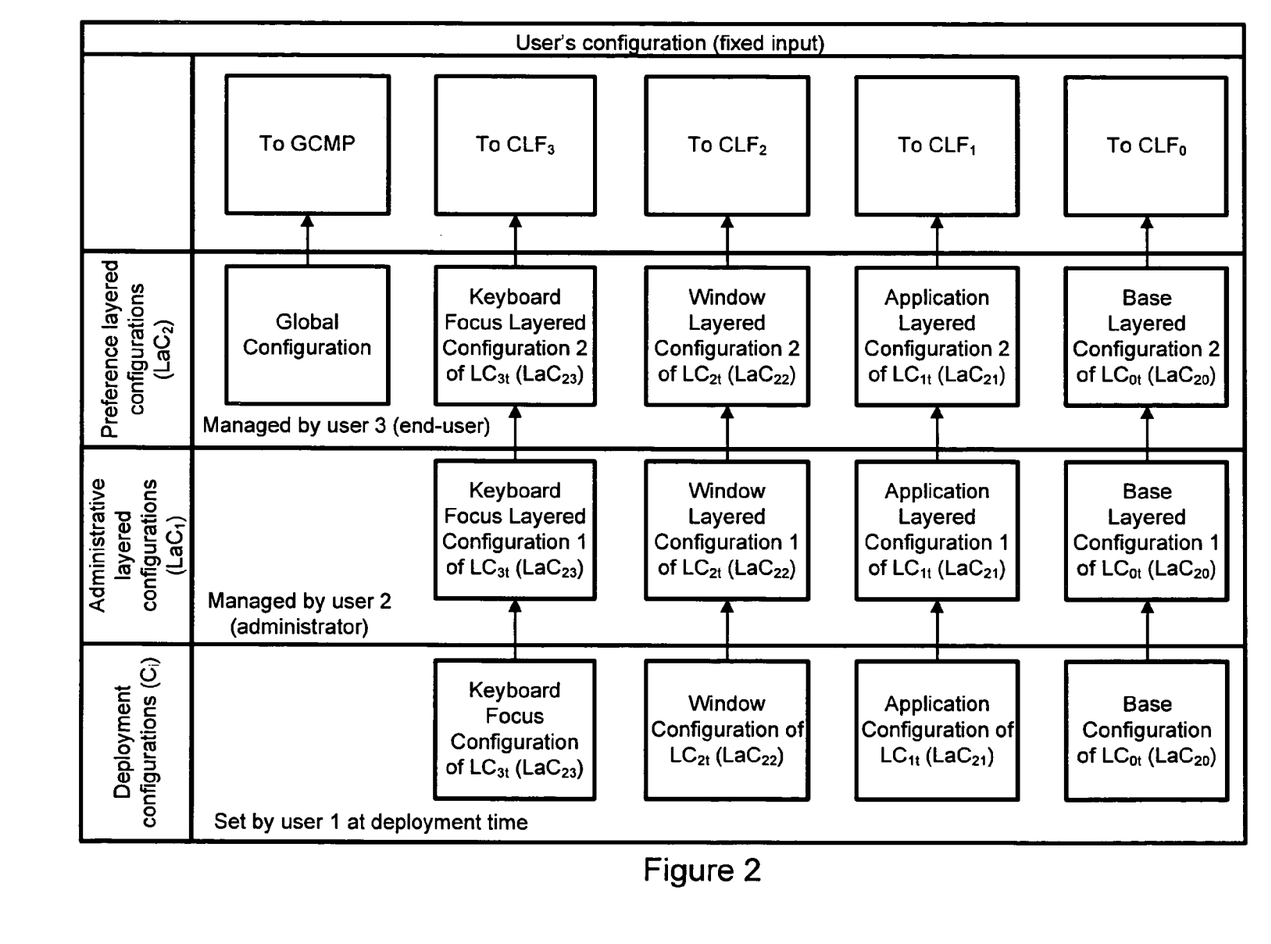
FIG. 2 shows a schematic diagram of a logical flow according to the first embodiment of the invention.

While referring to FIG. 2, it is possible to see the effect of Layered Configuration being factored in the User's Configuration box of FIG. 1. FIG. 2 is the preferred embodiment of the invention in regards to the User's Configuration. It assumes that most of the work is done by the user 1 at deployment time, that to make it as easy and straightforward as possible for the end-user (user 3) to become productive. User 1 fills the Configurations $C_0 \ldots C_N$ for the possible Level Criteria $LC_i$. Once that is done, user 1 can deploy its Configuration to the world. Once it is deployed, in a large institution for example, standardization may be welcome. For that reason, the Administration layered configuration ($LaC_1$) is introduced. The hypothetical large site's administrator (user 2) would be the exclusive owner of that layer (for example, password protected or by other methods of securing electronic data) and files related to this layered configuration reside on a server, and are synchronized to the local hard-drive periodically. That way, user 2 can, at any given time, change the configuration of its entire work-force without further complications related to deployment within its own institution. The following Layered Configuration ($LaC_2$) is allocated to final users (user 3) which may also change configurations prior to them getting to Configuration Level Filtering ($CLF_i$). Many Layered Configuration can be introduced within the invention (although the preferred embodiment uses 2). Also, some Layered Configuration ($LaC_{ki}$) as well as the Configurations ($C_i$) may follow other rules adopted in the state-of-the-art industry like, password-protection, download-upload synchronization, etc.

Attributes may also contain information in regards to subsequent Layered Configuration access. That is, a user managing the Layered Configuration $LaC_{ki}$ may well set a logical flag for each Attributes ($A_j$) to specify if each is available for edition or not for following Layered Configuration ($LaC_{(k+1)i}$). By doing that, for example, in the preferred embodiment of the invention, an administrator (user 2), can disable the accessibility to any Attribute ($A_j$) for the Preference Layered Configuration users (user 3).

Example 2

The present invention provides an improved speech recognition human computer user interface, which respects human cognitive and performance limitations in regards to how many voice commands can be memorized and used by a person. The preferred embodiment uses superposed speech recognition related content on a computer screen that does not disrupt other typical human user input devices and methods, including mouse and keyboard focus in a windowing computer operating system.

The present example provides, for example, a graphic overlay for a typical graphic user interface which is non-disruptive. Such added graphical layer may relate exclusively to speech recognition input (may be triggered by speech recognition commands) and may be translucent so that the user can still refer to the state-of-the-art graphical user-interface below if desired.

Mouse Control

Figure 3:
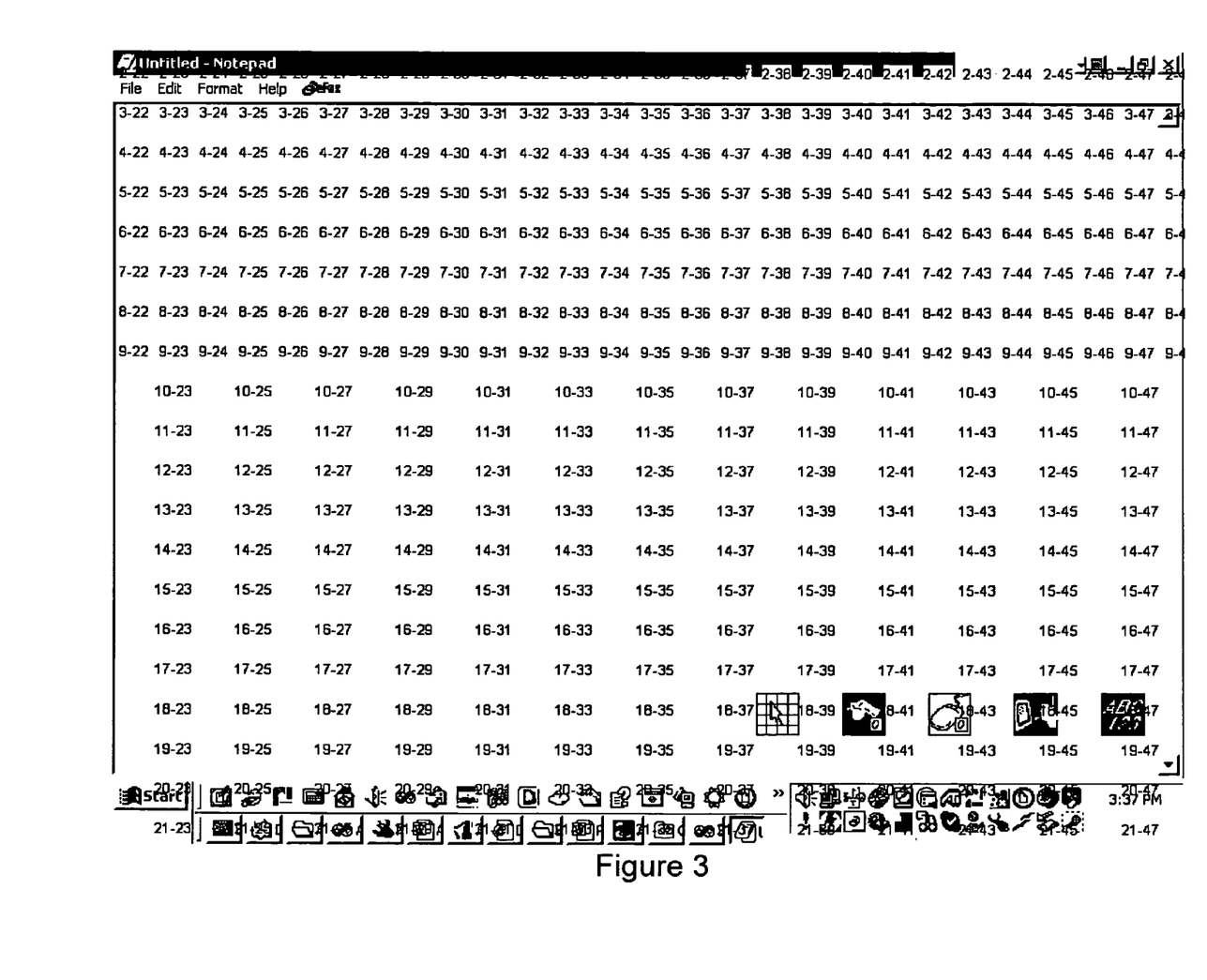
FIG. 3 shows an overlay graphic window according to a second embodiment of the present invention and FIG. 4 shows a graphic user interface produced by nonproprietary software which is enhanced with hotspots generated by proprietary software in accordance with the present invention.

As shown in FIG. 3, in order to complement a mouse, a speech recognition system may superpose a grid over the actual graphical user-interface in order to map a logical coordinate with an utterance that can be spoken. The grid may be translucent but the bulk of the state-of-the-art graphical user-interface behind has to stay visible. That way, the speaker is communicated a set of coordinates that it may use to perform operations on. For example, in the preferred embodiment of this invention, the coordinates are composed of 2 digit numbers pairs. Valid coordinates could be "23-51", or "21-55". A speaker may then say a command like "click twenty three fifty one" and a click would happen a the corresponding location in the state-of-the-art graphical user-interface under the number 23-51 of the superposed user-interface. But the user may also say a command like "move to twenty one fifty five" followed by the voice command "Drag to twenty three fifty one". That would in fact emulate a drag in a state-of-the-art graphical user-interface without using an actual mouse but speech recognition instead.

It is obviously not possible to fill the entire automated device's screen with coordinates, so holes are to be expected. In the event when a speaker needs to perform a mouse operation in an area that is within a hole of the communicated coordinates in the superposed user-interface, he may use 'shift' voice commands. By saying "shift right", for example, the entire set of coordinates would shift to the right. He could then shift the grid until a coordinate is over the desired point for his operation, and then continue by uttering his operation normally.

That same concept may also apply on limited areas of a state-of-the-art graphical user-interface so that the entire screen would not be filled of the superposed coordinate system.

Speech Recognition GUI and User-Experience

For cases where a graphical user-interface may be required as a response to a voice command on a speech recognition system, translucency can be used. Furthermore, that potential translucent graphical user-interface needs not to be disruptive towards commonly known state-of-the-art input methods (keyboard and mouse input). If the content to be communicated to the speaker cannot fit into a single screen, this embodiment of the present invention provides that the entire content needs to be scrolled at limited speed for the speaker to have enough time to read and react accordingly. That way, all the information that needs to be communicated to a speaker can be displayed without further knowledge on how to say any other voice commands to navigate through that complement graphical user-interface.

Example 3

Figure 4:
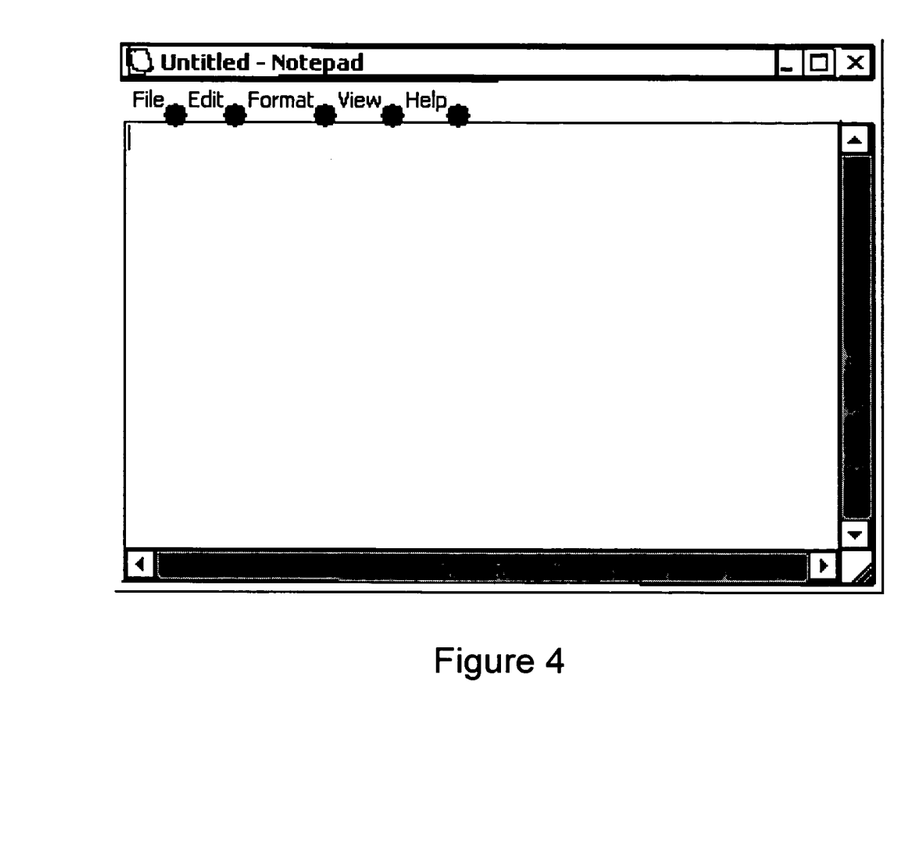

One embodiment of the invention provides a graphic user interface enhancement for operating systems and applications wherein the screen text, or objects within the computer that give rise to the screen text, are analyzed and made "speech enabled". Indeed, objects represented in a graphic user interface not associated with text or semantic labels may also be speech enabled. Thus, many common types of graphic user interface elements, which would normally require a point device initiated event to select and manipulate, can instead be selected or manipulated by an alternate user input, for example speech or keyboard. Preferably, a "hotspot" is presented in the graphic user interface to show screen objects which are recognized and available for manipulation by the alternate input. The hotspot is provided as an overlay, and therefore does not generally interact with the basic screen display elements. A typical layout is shown in FIG. 4, wherein a set of menu options each have an associated spot which indicates that the alternate input has recognized the graphic user interface object and it is available for manipulation. Alternately, for example in a browser context, the hotspots may be generated by modifying the page being displayed through appropriate code manipulation.

Typically, applications and shells of graphic user interface systems define display configurations by adopting parameters for use of a set of predefined objects, which are then displayed. The proprietary software can therefore analyze the parameters or resulting objects, making them accessible through alternate means from a normal pointing device. In some cases, a "map" or non-standard user interface is used, which does not provide defined high level objects; in that case, a graphic analysis system may be employed to process the display, and determine elements that are likely intended to be graphic user interface elements, for example by performing character recognition algorithms on text. Preferably, this alternate is a speech recognition system. In that case, each user interface object is assigned a label, which should be unique, and which is typically the corresponding spoken version of a text label or common description. Typically, the label will be a single word, often prominently displayed in association with the graphic user interface object. In the event that it is not possible to ensure the uniqueness of a label, the speaker may invoke it by stating the shared label. This invention would then proceed to a disambiguation interaction with the speaker by highlighting all components triggered by the voice command. Only after a successful disambiguation phase between the speaker and the system will a graphical user-interface interaction be generated.

Therefore, in operation, at least one text label is associated with each object. The text labels are then provided to a speech recognition engine, or the output of a speech-to-text engine used to determine a match with the labels. In either case, immediately after a match is found, or after a successful disambiguation phase, a pointing device event is generated at the location of the associated graphic user interface object, for example a mouse-click event. In some cases, a more complex event is desired, such as a double-click or drag. In that case, a preliminary modifier may be spoken, such as "double-click" or "drag" preceding the label. In the case of a "drag", a target position is then specified (unless the operation is to be concluded by a different user input device). The target position may itself have a label, or may be represented by a screen location, for example indicated by the grid shown in FIG. 3. Thus, the user could say, and have appropriately recognized, "double-click word", meaning that the proprietary software has recognized a Microsoft Word icon in Explorer, and that this icon is labeled "word", the position of which (i.e., center or within a discrete boundary) is then used to generate a double-click event, which would open the "Word" application. In the case of a drag operation, a document file icon with name "Letter" may be opened in Microsoft Word, by speaking "drag . . . Letter . . . to . . . Word", which corresponds to generating a mouse pointer down event at the "Letter" icon, repositioning the cursor location at the "Word" icon, and generating a mouse pointer up event, thus opening the Letter file in Microsoft Word.

As an alternate to the hotspots shown in FIG. 4, the display text may be rendered or overlay with a designated text style or display attribute or overlay, for example italic, pink or dynamically changing, to indicated that they are speech enabled. This option is particularly appropriate for use in browsers, since a number of different attributes are controllable, for example in HTML, without altering the screen or page layout and spatial arrangement.

The foregoing description of the preferred embodiments of the invention is by way of example only, and other variations of the above-described embodiments and methods are provided by the present invention. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The invention is limited only by the following claims.

The invention claimed is:

1. A method for interaction with a computer software application having a native interface having a set of dynamically changing user interface elements for interaction with a human user, executing under control of an operating system on an automated processing system, having a context comprising a focus, the operating system selectively providing received user inputs from a human user to a respective user interface element having the focus, comprising:
    determining the context of the operating system executing the at least one software application, based on at least an analysis of the set of dynamically changing user interface elements of the native interface of the computer software application;
    defining, through the operating system, a supplemental interface for interaction between the human user and an automated user interface system with the at least one computer software application, selected from a plurality of available supplemental interfaces, each respective supplemental interface supporting at least one human user input unsupported by the respective changing user interface element available in the native interface in the context, a respective supplemental interface being selectively made available through the automated user interface system for the respective user interface element having the focus in dependence on the determined context comprising the focus; and
    communicating with the computer software application having focus using at least the input unsupported by the native interface of the respective defined supplemental interface,
    wherein the computer software application receives input from the respective defined supplemental interface using at least the input unsupported by the native interface without requiring either access to a source code of the computer software application, or modification to the computer software application,
    wherein the at least one input unsupported by the native interface comprises a speech input corresponding to a graphic user interface command of the native interface.

2. The method according to claim 1, wherein the determined context has a hierarchy, and wherein the respective supplemental interface is defined based on a plurality of sets of configurations having a priority varying according to the hierarchy.

3. The method according to claim 1, wherein the determined context comprises at least one set of dynamically changing available commands of the native interface.

4. The method according to claim 1, wherein the determined context comprises a set of open windows within a graphic user interface of the native interface.

5. The method according to claim 1, wherein the determined context is associated with a set of configurations, each respective configuration comprising a predetermined file associated with a respective dynamically presented object of the native interface.

6. The method according to claim 1, wherein the determined context is associated with at least one set of configurations comprising speech commands for control of the computer software application.

7. The method according to claim 1, wherein said communicating comprises presenting a message comprising a text string to the computer software application.

8. A system providing a modified interaction of a human user with a computer software application having a native interface, executing under an operating system having a determinable context comprising at least a dynamically changing state of a human user interface comprising a focus representing a user interface element which receives human user input, the system comprising:
   a plurality of supplemental interfaces for interaction by the human user with the at least one computer software application, each supplemental interface supporting at least one human user input type which is unsupported by a respective associated human user interface element of the native interface; and
   a processor configured to select at least one of the plurality of supplemental interfaces based on at least the context which is appropriate for the human user interface element which has the focus, and to communicate in relation to the computer software application through the at least one of the plurality of supplemental interfaces using at least the at least one input type which is supported by the selected supplemental interface and unsupported by the native interface, wherein a human user interaction with the native interface is modified by use of the at least one of the plurality of supplemental interfaces to permit use of the at least one human user input type which is unsupported by the native interface without requiring either access to the source code of the computer software application, or modification to the computer software application,
   wherein the native interface specifies receipt of human user input through a graphic user interface as a pointing device input or a keyboard input, and at least one of the plurality of supplemental interfaces is configured to receive a speech input and to present information selectively corresponding to the speech input to the native input as a command.

9. The system according to claim 8, wherein the context has a hierarchy, and wherein the supplemental interface is defined based on a plurality of sets of configurations having a priority varying according to the hierarchy.

10. The system according claim 8, wherein the context comprises at least one set of dynamically changing available commands of the native interface.

11. The system according to claim 8, wherein the context comprises a set of open windows within a graphic user interface of the native interface, wherein the focus determines which of the set of open windows receives the user input of the at least one human user input type which is supported by the selected supplemental interface and unsupported by the native interface.

12. The system according to claim 8, wherein a respective supplemental interface comprises a set of configurations, each configuration comprising a predetermined file defining a set of user-selectable options associated with a dynamically selectively presented user interface object in the native interface.

13. The system according to claim 8, wherein a respective supplemental interface comprises a set of configurations, each respective configuration comprising a data file representing parameters for processing speech input of the supplemental interface corresponding to a graphic user interface command of the native interface.

14. The system according to claim 8, wherein the at least one the plurality of supplemental interfaces comprises a set of speech commands.

15. The system according to claim 8, wherein the processor is configured to communicate by at least presenting a message comprising a text string generated by a respective supplemental interface to the native interface of the computer software application.

16. A graphic user interface computer system, communicating with a display device configured to present to a human user a set of graphic objects defined by at least one software application executing under control of an operating system having a context comprising a focus which dynamically associates a human user input with a respective graphic object of the set of graphic objects, having a native graphic user interface, comprising:
   a speech recognition engine executing under the operating system, configured to receive user speech commands and to output at least one control signal for the at least one software application;
   a voice controlled graphic layer executing under the operating system, superposed on, or blended over, the native graphic user interface or a representation of the graphic user interface of the at least one software application, the voice controlled graphic layer supporting at least one human user input unsupported by the native graphic user interface, the voice controlled graphic layer being defined independently of the source code of the at least one software application, configured to present a graphic indication to the human user of available speech commands for the respective graphic object of the set of graphic objects of the at least one software application selectively in response to a determination of which graphic object has focus, wherein the superposed voice controlled graphic layer does not disrupt a clarity of the native graphic user interface; and
   an input port configured to receive a speech input to the speech recognition engine.

17. A method of speech enabling a software application defining a native graphic user interface having a plurality of distinct graphic user interface events, for execution under a computer operating system, within an automated processing system, having a context defined by at least a graphic user interface status of the computer operating system and any applications executing under the computer operating system, the operating system having a focus for controlling a respective graphic human user interface element which is associated with a human user input, comprising:
   generating a native graphic user interface of the software application;
   overlaying, by a supplemental application distinct from the software application, executing under the computer operating system, a plurality of identified regions on the native graphic user interface in dependence on the context and independent of a source code of the software application;
   receiving a speech input from a human user, identifying a selected identified region, corresponding to a graphic human user interface element of the native graphic user interface of the software application, to grant focus to the corresponding graphic human user interface element if it does not have focus; and generating, selectively in dependence on an analyzed content of the speech input, at least one graphic user interface event supported by the native graphic user interface associated with the graphic human user interface element corresponding to the selected identified region.

18. The method according to claim 1, wherein at least one of the set of dynamically changing user interface elements is repositionable, further comprising selectively repositioning the repositionable at least one of the set of dynamically changing user interface elements in response to a speech command defining the repositioning, received through the supplemental interface.

19. The method according to claim 17, wherein at least one of the plurality of distinct graphic user interface events is responsive to pointing device commands received through the native graphic user interface, further comprising emulating the pointing device commands dependent on the received speech input by the supplemental application.

20. The method according to claim 17, wherein the defined context is associated with a configuration file comprising predetermined parameters associated with a state of the respective graphic human user interface element having the focus.

* * * * *